US006545776B1

(12) United States Patent
Machida et al.

(10) Patent No.: US 6,545,776 B1
(45) Date of Patent: Apr. 8, 2003

(54) IMAGE SENSOR IC, FACSIMILE APPARATUS AND IMAGE SCANNER APPARATUS USING THE IMAGE SENSOR ICS

(75) Inventors: Satoshi Machida, Chiba (JP); Yukito Kawahara, Chiba (JP); Masahiro Yokomichi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/191,888

(22) Filed: Nov. 13, 1998

(30) Foreign Application Priority Data

Dec. 17, 1997 (JP) .............................. 9-348340
Mar. 3, 1998 (JP) ............................ 10-051164

(51) Int. Cl.⁷ ................................. H04N 1/04
(52) U.S. Cl. .................... 358/482; 250/208.1
(58) Field of Search .............. 250/208.1, 214 R, 250/208.2, 208.3, 208.4; 358/482, 483

(56) References Cited

U.S. PATENT DOCUMENTS 5,861,621 A * 1/1999 Takebe ................. 250/214 R
6,031,217 A * 2/2000 Aswell ................ 250/208.1
6,097,022 A * 8/2000 Merrill ................ 250/208.1

* cited by examiner

Primary Examiner—Jerome Grant, II
(74) Attorney, Agent, or Firm—Adams & Wilks (57) ABSTRACT

According to the present invention, there is provided an image sensor for receiving light reflected from an original copy on which the light has been irradiated and for converting the received light into electrical signals, the image sensor having a simple configuration, no residual image, a small fluctuation in the dark outputs, and a good S/N ratio. In order to achieve such an image sensor, an output terminal of a photodiode is reset to a constant voltage, and an image signal output of the photodiode and the reference voltage output immediately after the photodiode is reset are performed succeedingly, using a clamping circuit.

4 Claims, 6 Drawing Sheets

Fig. 3 sampling point

IMAGE SENSOR IC, FACSIMILE APPARATUS AND IMAGE SCANNER APPARATUS USING THE IMAGE SENSOR ICS

BACKGROUND OF THE INVENTION

1. Field of the Invention

The present invention relates to a one-dimensional image sensor for receiving light reflected from an original copy on which the light has been irradiated and for converting the received light into electric signals. More specifically, the present invention is directed to an image reading apparatus such as facsimile machines and image scanners to which the one-dimensional image sensor according to the present invention is applied.

2. Description of the Related Art

Figure 2:
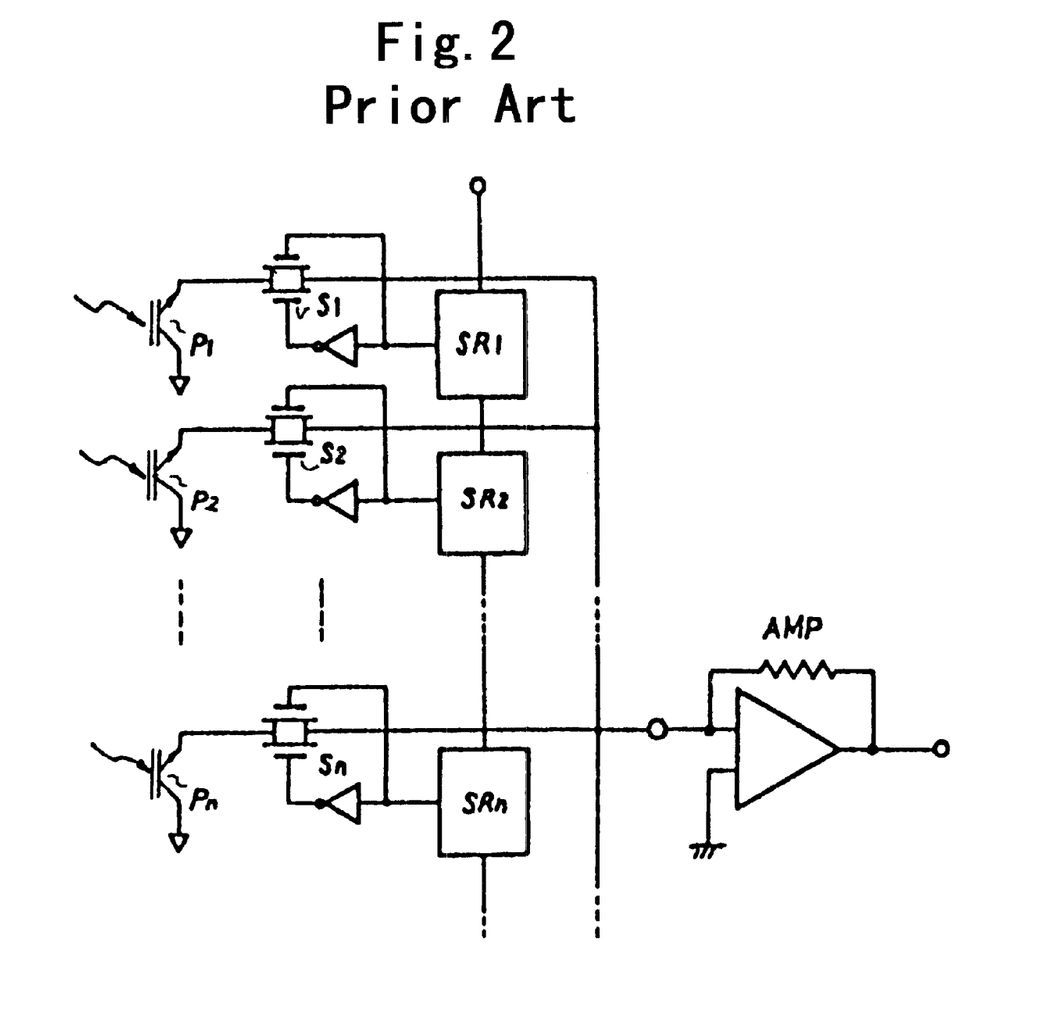
FIG. 2 is a circuit diagram of a contact-type one-dimensional image sensor IC utilized in conventional image reading apparatuses.

FIG. 2 is a circuit diagram of a contact-type one-dimensional image sensor IC used in conventional image reading apparatuses. There is shown in FIG. 2 a system for successively turning ON switches S1–Sn to read out outputs of phototransistors P1–Pn on a common signal line. The above-mentioned contact-type phototransistor one-dimensional image sensor is described in Japanese Patent Application Laid-Open No. Sho 61-124171.

In such a one-dimensional image sensor, however, there is a problem in that since carriers remaining on the bases of the phototransistors are removed through an emitter, a base potential cannot be sufficiently reset to an initial state, resulting in increased residual images.

SUMMARY OF THE INVENTION

In view of the above, an object of the present invention is to provide an image sensor having diminished residual images with a low cost.

In order to solve such a problem inherent in conventional image sensors, according to the present invention, a photodiode is used for a light receiving element, and an output terminal of a photodiode is reset to a constant voltage to thereby realize reduced residual images. Further, an image signal output of the photodiode and a reference voltage output immediately after the photodiode is reset are succeedingly performed using a clamping circuit. Therefore, an image sensor having a small fluctuation in dark outputs and a good S/N ratio can be obtained at a low cost.

DETAILED DESCRIPTION OF THE INVENTION

According to the present invention, there is provided an image sensor so arranged as follows.

In an image sensor for successively reading out outputs of a plurality of photodiodes as image signal outputs on a common signal line via a first amplifier, an operation is repeated in which an image signal output of a first photodiode is read out, and thereafter an output terminal of this photodiode is reset to a constant voltage; and after termination of the reset, an output of this photodiode is again read out as a reference voltage output; and then an image signal output of a second photodiode is read out.

Further, the image sensor according to the present invention is arranged so that an output of the common signal line is supplied to a second amplifier, whereby the image signal output and the reference voltage output are amplified.

In addition, arrangement is made in such a manner that a capacitance is connected in series between the output of the second amplifier and the output terminal of the image sensor to form a clamping circuit in which the output terminal is connected to a reset switch. The reset switch is kept ON during the time interval between the time immediately before the image signal output of each photodiode initiates and the time immediately before the image signal output of each photodiode terminates, and a potential of the output terminal is thus held to the reset voltage.

With the foregoing arrangement, if a sample and hold operation is carried out immediately before the reference voltage output of each photodiode terminates to be read out, an image sensor having a small fluctuation in dark output between the respective bits and a good S/N ratio can be obtained. That is, since the image signal output and the reference voltage output of the respective bits pass through the same output path, the offset due to switching noise or the amplifiers is completely carried out through the clamping circuit.

Also, each photodiode is reset to a constant voltage, and thus an image sensor having reduced residual images can be realized.

BRIEF DESCRIPTION OF THE DRAWINGS

Other objects and advantages of the present invention will be apparent during the following discussion with reference to the accompanying drawings, wherein.

DETAILED DESCRIPTION OF THE PREFERRED EMBODIMENTS

Hereinbelow, description will be made of embodiments according to the present invention.

Figure 1A:
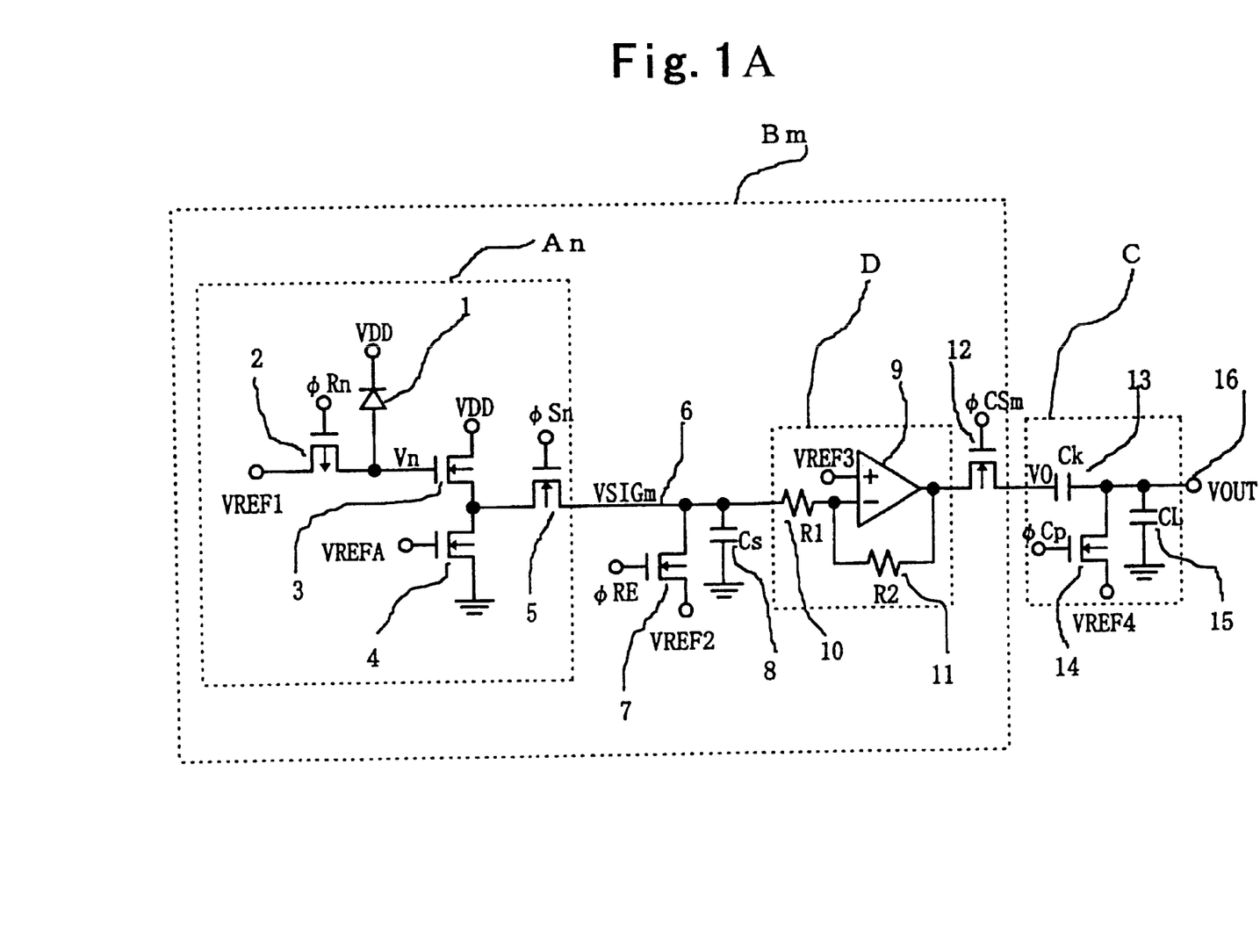
FIG. 1 is a circuit diagram of an image sensor in accordance with the present invention.
Figure 1B:
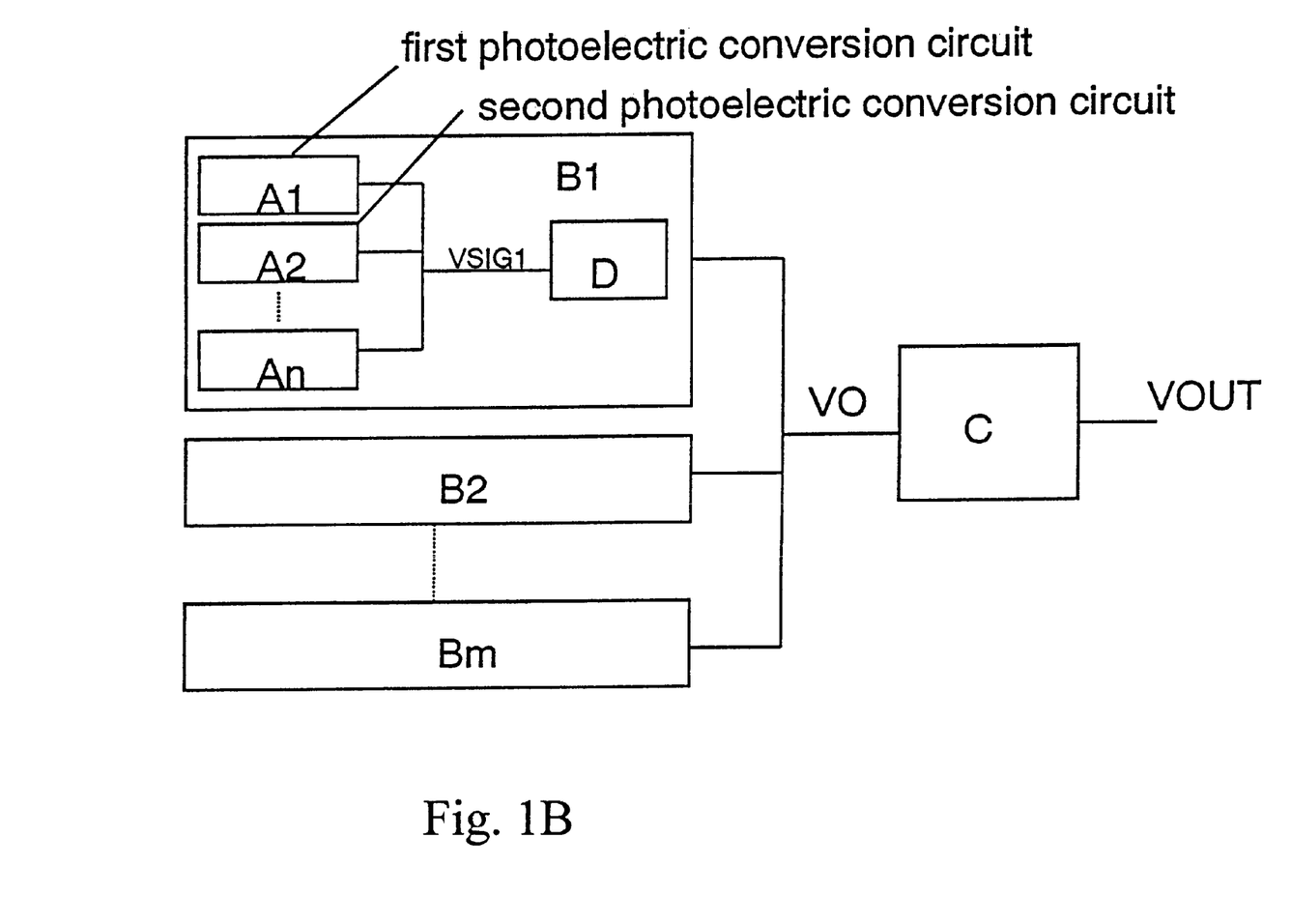

FIGS. 1A and 1B are circuit diagrams of an image sensor of the present invention.

An N-type region of a photodiode 1 is connected to a positive power supply voltage terminal VDD, and a P-type region is connected to a drain of a reset switch 2 and a gate of a source follower amplifier 3. A reference voltage VREF1 is supplied to a source of the reset switch 2. A source serving as an output terminal of the source follower amplifier 3 is connected to a read-out switch 5 and a constant current source 4. A constant voltage VREFA of a reference voltage source is supplied to a gate of the constant current source 4. A number of components arranged in photoelectric conversion blocks An shown in FIG. 1 are provided in correspondence with the number of pixels. The read-out switch 5 in each of the blocks is connected to a common signal line 6. It is noted that a photoelectric conversion block An represents the photoelectric conversion block of an n-th bit.

The common signal line 6 is connected to an inverting input terminal of an operational amplifier 9 via a resistance 10, and an output terminal of the operational amplifier 9 is connected to an output terminal 16 via a chip selection switch 12 and a capacitance 13. The common signal line 6 is connected to a signal line reset switch 7, and a reference voltage VREF2 is supplied to a source of the signal line reset switch 7. A resistance 11 is connected between the output terminal and the inverting input terminal of the operational amplifier 9, and a non-inverting input terminal of the operational amplifier 9 is fixed to a constant voltage VREF3. An inverting input amplifier D is made up of the operational amplifier 9, the resistance 10, and the resistance 11.

As shown in FIG. 1B, components included in image sensor IC blocks Bm are arranged on one IC, and a plurality of such ICs may be arranged in line to constitute a multi-chip image sensor system. In this case, a plurality of IC output terminals may be connected to one capacitance 13. It is noted that an image sensor IC block Bm represents an m-th chip in the image sensor IC block.

The output terminal 16 of the image sensor is connected to a drain of a MOS transistor 14, and a reference voltage VREF4 is supplied to a source of the MOS transistor 14. A capacitance 15 such as a parasitic capacitance is also connected to the output terminal 16 of the image sensor. A clamping circuit C is made up of the capacitance 13, the capacitance 15, and the MOS transistor 14.

Figure 3:
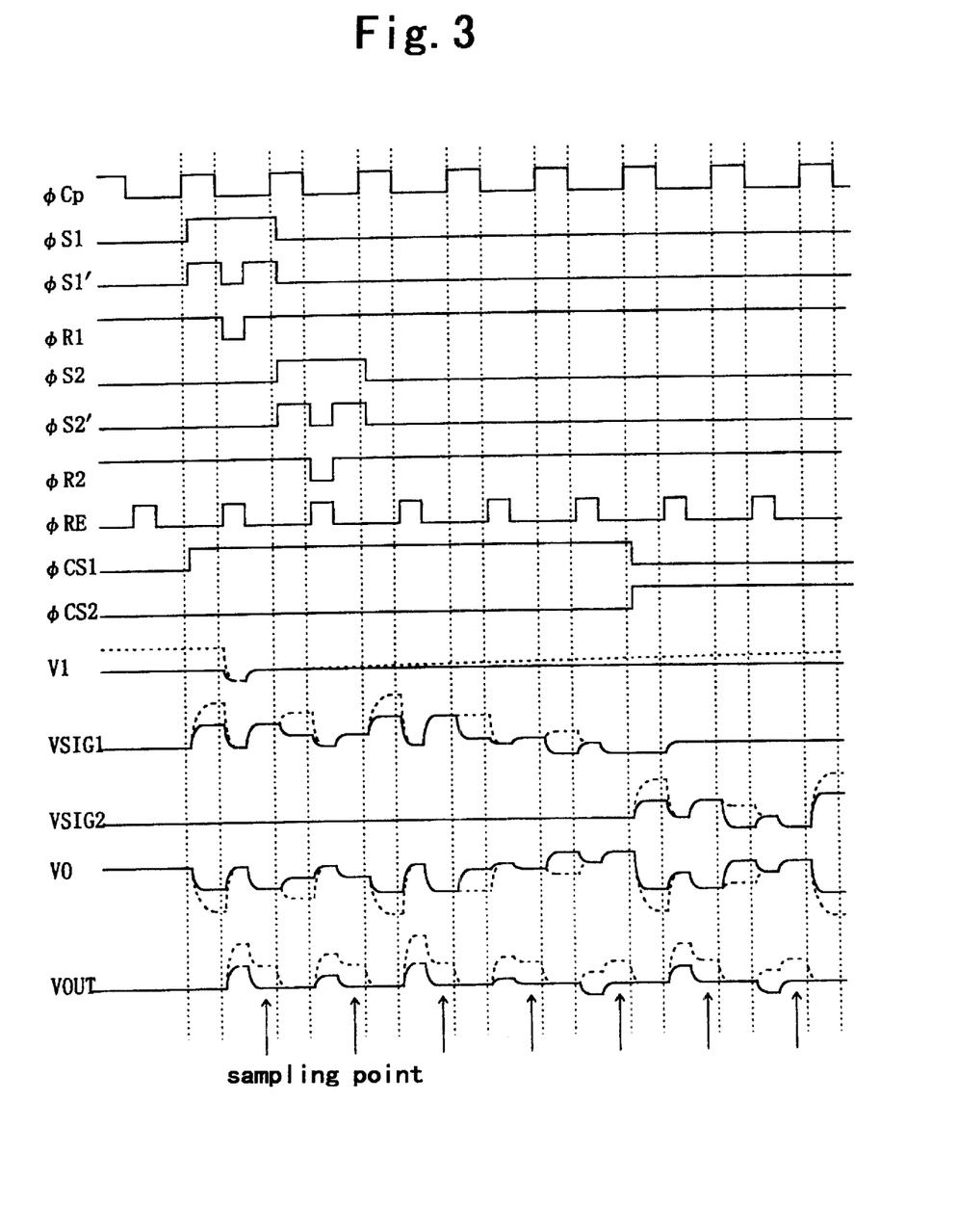
FIG. 3 is a timing chart of the image sensor in accordance with the present invention.

FIG. 3 is a timing chart of the image sensor according to the present invention. Referring to FIGS. 1 and 3, description will be made of an operation of the image sensor of the present invention.

Initially, a description is given of an operation of the photoelectric conversion block An of an n-th bit within an m-th chip of the image sensor IC block Bm. During a reset operation, when the reset switch 2 is turned ON, a potential Vn of the P-type region of the photodiode 1 is fixed to the reference voltage VREF1. Then, when the reset switch 2 is turned OFF, a potential fluctuation VRn due to switching noise of the reset switch 2 is applied, and then a potential Vn of the P-type region of the photodiode 1 becomes $$Vn(K)=VREF1+VRn, \quad \text{Eq. (1)}$$

wherein $Vn(K)$ is an initial potential of the P-type region of the photodiode 1 immediately after the reset switch 2 is turned OFF.

Next, during a reference voltage output operation, when the read-out switch 5 is turned ON, while charging a parasitic capacitance 8, a potential VSIGm of the common signal line 6 may approach $$VSIGmn(K)=VREF1+VRn+Voffn, \quad \text{Eq. (2)}$$

wherein $VSIGmn(K)$ is a potential of the common signal line 6 after a sufficient time elapses since the read-out switch 5 in the photoelectric conversion block An of the n-th bit is turned ON, and Voffn is an offset voltage of the source follower amplifier 3 in the photoelectric conversion block An of the n-th bit. Incidentally, the gain of the source follower amplifier 3 is set to 1. The read-out switch 5 is turned ON immediately after the reset switch 2 is turned OFF or while the reset switch 2 is ON. Therefore, even if light has entered into the photodiode 1, an increase in the potential Vn of the P-type region of the photodiode 1 caused by the incident light may be ignored. If the read-out switch 5 is kept ON until the source follower amplifier 3 becomes in a balanced condition, the potential VSIGm of the common signal line 6 in the case where the read-out switch 5 is turned OFF reaches the value of the VSIGmn(K) expressed by Eq. (2). This VSIGmn(K) is a potential of the reference voltage output in the photoelectric conversion block An of the n-th bit within the m-th chip of the image sensor IC block Bm.

The photodiode 1 initiates an accumulation operation after the reset switch 2 is turned OFF, and the potential Vn of the P-type region of the photodiode 1 increases in correspondence with the amount of the light incident to the photodiode 1. The accumulation operation commonly takes several msecs.

Then, during an image signal output reading operation, assuming that the potential Vn of the P-type region of the photodiode 1 is Vn(S) in the case where the read-out switch 5 is turned ON, the following may be obtained $$Vn(S)=VREF1+VRn+VPn, \quad \text{Eq. (3)}$$

wherein VPn is an increase amount of the potential Vn of the P-type region of the photodiode 1 during the accumulation operation, which is substantially proportional to the amount of the light incident to the photodiode 1. In this case, the leak current of the photodiode 1 may be so small that it may be ignored.

Accordingly, during the image signal output reading operation, when the read-out switch 5 is turned ON, while charging the parasitic capacitance 8, the potential VSIGm of the common-signal line 6 may approach $$VSIGmn(S)=VREF1+VRn+VPn+Voffn, \quad \text{Eq. (4)}$$

wherein VSIGmn(S) is a potential of the common signal line 6 after a sufficient time elapses since the read-out switch 5 in the photoelectric conversion block An of the n-th bit is turned ON. This VSIGmn(S) is a potential of the image signal output in the photoelectric conversion block An of the n-th bit within the m-th chip of the image sensor IC block Bm. If the read-out switch 5 is turned OFF, substantially concurrently therewith the reset switch 2 is turned ON to initiate the reset operation. Therefore, the image signal output and the reference voltage output in the photoelectric conversion block An of the n-th bit are continuously performed. FIG. 3 shows a change in a potential V1 of the P-type region of a first bit of the photodiode 1 within a first chip of the image sensor IC block B1. In FIG. 3, a broken line indicates the condition where the light enters, and a solid line indicates a dark condition (i.e., VP1=0). FIG. 3 also shows the changes in a potential VSIG1 of the common signal line in the first chip of the image sensor IC block B1 and a potential VSIG2 of the common signal line in the second chip of the image sensor IC block B2. In FIG. 3, a broken line indicates the condition where the light enters, and a solid line indicates a dark condition (i.e., VPn=0). The magnitude of VRn and Voffn expressed by Eqs. (2) and (4) fluctuates among the respective bits, so that the potential VSIGmn(K) of the reference voltage output of the respective bits expressed by Eq. (2) is different from one another.

Referring to FIG. 3, a first bit and a second bit of reset pulses in the first chip of the image sensor IC block B1 may be indicated at ØR1 and ØR2, respectively. It is noted that ØRn is indicative of the reset pulse of an n-th bit. A first bit and a second bit of read-out pulses of the image signal output and the reference voltage output in the first chip of the image sensor IC block B1 is indicated at ØS1' and ØS2', respectively. A first pulse of the read-out pulse ØS1' indicates a period of the image signal output of the first bit, and a second pulse of the read-out pulse ØS1' indicates a period of the reference voltage output of the first bit. This read-out pulse may be continued such as ØS1, ØS2 and so on as shown in FIG. 3. Such pulses as ØS1, ØS2, . . . ØSn and ØR1, ØR2, . . . ØRn are generated by a shift register or the like.

The signal line reset switch 7 is turned ON by a pulse ØRE, to thereby initialize the potential VSIGm of the common signal line 6 to the reference voltage VREF2. This operation may be useful when the driving ability of the source follower amplifier 3 in the respective photoelectric conversion blocks A1, A2, ... An is insufficient. That is, the potential VSIGm of the common signal line 6 can constantly be fixed to the reference voltage VREF2 prior to initiation of the reference voltage output of the respective bits. If the driving ability of the source follower amplifier 3 is sufficient, the signal line reset switch 7 is not necessary.

The voltage of the common signal line 6 is supplied to the inverting amplifier D that is made up of the resistance 10, the resistance 11 and the operational amplifier 9, and is then amplified. The voltage is then output from the IC via the chip selection switch 12. The chip selection switch 12 in the image sensor IC block Bm is kept ON during the time interval 12 between initiation of the image signal output of the first bit in image sensor IC block Bm and termination of the reference voltage output of the final bit therein. The chip selection switch 12 must be provided so that the outputs of the respective chips do not short in the multi-chip system image sensor. FIG. 3 illustrates gate pulses ØCS1 and ØCS2 of the chip selection switch 12 in both the first chip of the image sensor IC block B1 and the second chip of the image sensor IC block B2. If the chip selection switch 12 in the image sensor IC block B1 is turned OFF, the chip selection switch 12 in the image sensor IC block B2 is designed to be turned ON substantially concurrently therewith. Further, VO is a potential of a connecting portion between the capacitance 13 and the outputs of all the image sensor IC blocks Bm, and is equivalent to an output voltage of the inverting amplifier D within the image sensor IC block Bm in which the chip selection switch 12 is ON. Therefore, a waveform of the VO is shown in FIG. 3. The image sensor having one chip does not require the chip selection switch 12. It is noted that ØCSm is a pulse that is inputted to the gate of the chip selection switch 12 in the m-th chip of the image sensor IC block Bm.

Assuming that the output voltage of the inverting amplifier D is VOmn(S) at the time of termination of the image signal output in the photoelectric conversion block An of the n-th bit within the m-th chip of the image sensor IC block Bm, since the potential of the common signal line 6 at the time when the image signal output terminates is VSIGmn(S) expressed by Eq. (4), the following may be obtained $$VOms(S)=(VREF3-VREF1-VRn-VPn-Voffn)R2/R1+VREF3 \quad \text{Eq. (5)}$$

wherein R1 and R2 are resistance values of the resistance 10 and the resistance 11, respectively.

In a similar manner, assuming that the output voltage of the inverting amplifier D is VOmn(K) at the time when the reference voltage output terminates, since the potential of the common signal line 6 at time when the reference voltage output terminates is VSIGmn(K) expressed by Eq. (2), the following may be obtained $$VOmn(K)=(VREF3-VREF1-VRn-Voffn)R2/R1+VREF3. \quad \text{Eq. (6)}$$

If VREF3 is set to a value approaching value to VREF1+ VRn+Voffn, the gain R2/R1 of the inverse amplifier D can be increased.

As seen from the clamp pulse ØCp shown in FIG. 3, the MOS transistor 14 is ON immediately before the image signal output terminates, and the potential VOUT of the output terminal 16 is fixed to VREF4. Thereafter, the MOS transistor 14 is kept OFF until a subsequent sampling point.

Assuming that the potential of the output terminal 16 at a sampling point be VOUT(S), from Eqs. (5) and (6) we may obtain $$VOUT(s) = VREF4 + \frac{Ck}{Ck+CL}(VOmn(K) - VOmn(S)) = \quad \text{Eq. (7)}$$
$$VREF4 + \frac{Ck}{Ck+CL} * \frac{R2}{R1}VPn,$$

Wherein Ck and CL are capacitance values of the capacitance 13 and the capacitance 15, respectively. In this case, it is assumed that the charge of the output terminal 16 is accumulated while the MOS transistor 14 is being OFF. Further, since VRn and Voffn expressed by Eqs. (5) and (6) are values in the same photoelectric conversion blocks An as each other, these values may be considered to be the same, so that these values may not appear in Eq. (7). Since the inverse amplifier D is interposed, from Eq. (7), it can be seen that positive sensitivity can be obtained. Assuming that the VOUT(S) under a dark condition be a dark output voltage VOUT(S, dark), VPn=0 can be attained, so that the following may be obtained $$VOUT(S, \text{dark})=VREF4 \quad \text{Eq. (8)}$$

Therefore, a constant value may be obtained independent of the photoelectric conversion blocks or the image sensor IC blocks. That is, since the image signal output and the reference voltage output of the respective bits pass through the same output path, switching noise or the offset of the amplifiers is completely carried out through the clamping circuit.

Referring again to FIG. 3, in the waveforms of the signals VSIG1 and VSIG2, the image signal output and the reference voltage output of the respective bits are different in their levels. On the other hand, the image signal output and the reference voltage output of the respective bits are the same under the dark condition. Further, the waveform of the signal VO is the combined inverted waveform of the signals VSIG1 and VSIG2. In the waveform of the potential VOUT of the output terminal 16 that has passed through the clamping circuit C, the time approximately at the reference voltage output of the respective bits terminates is made a sampling point, and thus the sampling levels of all bits become the same under the dark condition.

Referring once again to FIG. 3, if the chip selection switch 12 in the first chip of the image sensor IC block B1 is set to be turned ON by the chip selection pulse ØCS1, and the chip selection switch 12 in the second chip of the image sensor IC block B2 is set to be turned ON by the chip selection pulse ØCS2, the outputs of the respective image sensor IC blocks Bm can be taken out continuously, so that all the blocks of the dark output voltages become a constant value expressed by Eq. (8).

Therefore, according to the present invention, the image signal output of the photodiode and the reference voltage output immediately after the photodiode is reset are performed succeedingly, using the clamping circuit, so that a small fluctuation in the dark outputs can be obtained. Also, if the gain of the inverting amplifier is increased, the sensitivity may be enhanced.

In the image sensor IC according to the present invention, the photoelectric conversion block An of the respective bits is made up of only a few components as shown in FIG. 1, to thus enable the area of the IC to be reduced.

Accordingly, an image sensor having a good S/N ratio can be realized at a low cost.

In the foregoing description, the source follower amplifier 3 may be substituted by another type of amplifier, and no amplifier may be required if the sensitivity of the photodiode 1 is high.

Also, in place of the inverting amplifier D, a buffer amplifier or non-inverting amplifier may be utilized.

According to the present invention, therefore, there is provided at a low cost an image sensor IC having a simple configuration, no residual image, a small fluctuation in the dark outputs, and a good S/N ratio. Furthermore, a contact-type image sensor can be realized wherein a plurality of the image sensor ICs are installed in line.

Figure 4:
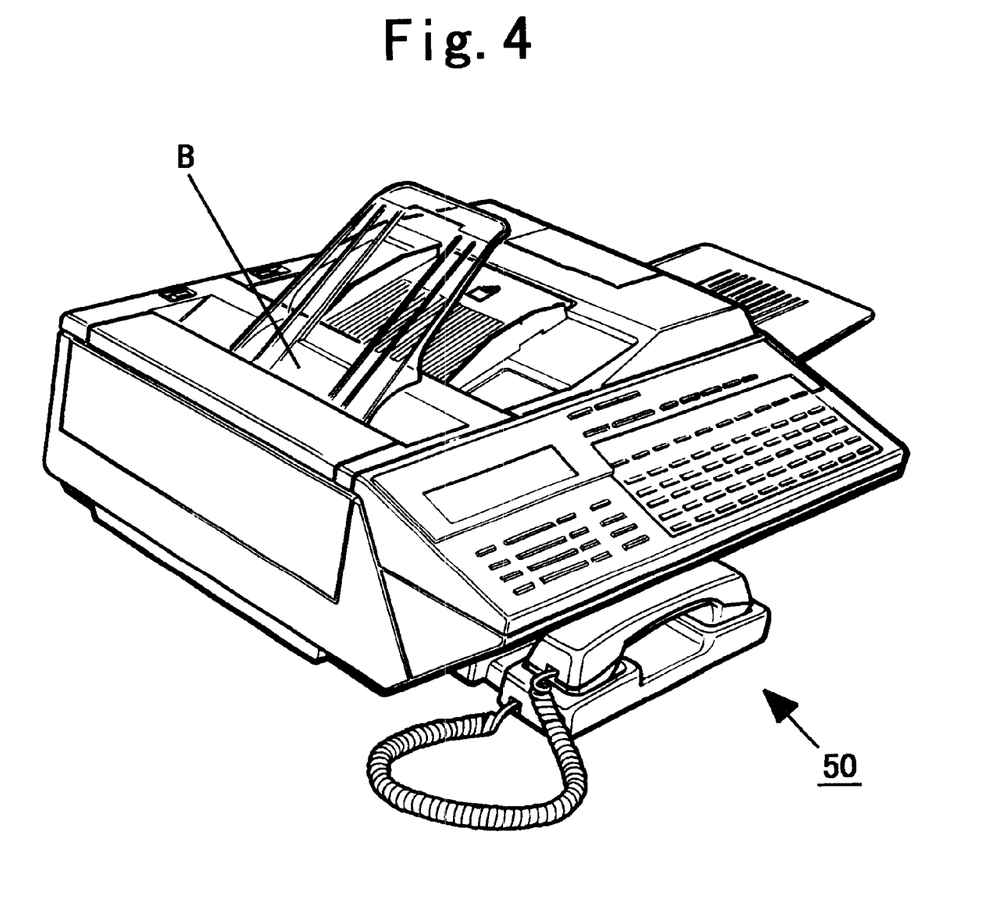
FIG. 4 is a external view of the facsimile apparatus using the image sensor ICs in accordance with the present invention.
Figure 5:
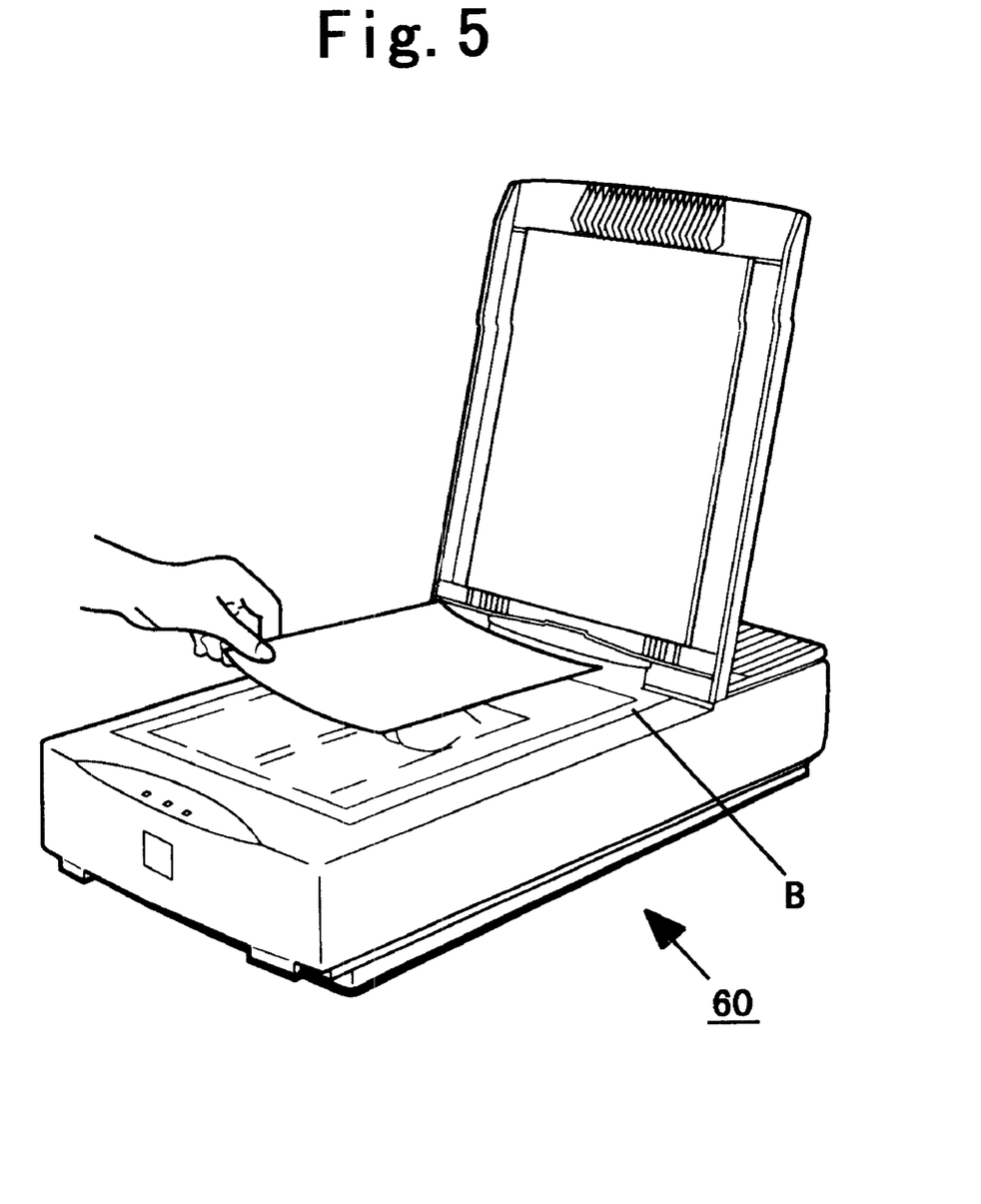
FIG. 5 is a external view of the image scanner apparatus using the image sensor ICs in accordance with the present invention.

FIG. 4 is a external view of a facsimile apparatus 50 and FIG. 5 is a external view of the image scanner apparatus 60 according the present invention. Each apparatus contains the image sensor ICs Bm according the present invention inside, and has the same advantage as the image sensor ICs.

While the present invention has been shown in conjunction with preferred embodiments thereof, it is not so limited but is susceptible of many variations and modifications without departing from the spirit and scope of the appended claims.

What is claimed is:

1. A method for successively reading from respective photodiodes of an image sensor having a plurality of photoelectric conversion circuits each having a photodiode and a first amplifier, the outputs of the photoelectric conversion circuits being connected to a common signal line, the method comprising the steps of:

reading an image output signal of a photodiode of a first photoelectric conversion circuit, and thereafter resetting an output terminal of the photodiode to a reference voltage;

after resetting the output terminal of the photodiode, reading a reset output signal of the photodiode as a reference voltage output; then reading an image output signal of a photodiode of a second photoelectric conversion circuit;

resetting the output terminal of the photodiode of the second photoelectric conversion circuit to the reference voltage; and after resetting the output terminal of the photodiode of the second photoelectric conversion circuit, reading an output signal of the photodiode of the second photoelectric conversion circuit as a reference voltage output.

2. A method according to claim 1; further comprising the steps of obtaining a difference between the image output signal of the photodiode of the first photoelectric conversion circuit and the reset output signal of the photodiode of the first photoelectric conversion circuit; and obtaining a difference between the image output signal of the photodiode of the second photoelectric conversion circuit and the reset output signal of the photodiode of the second photoelectric conversion circuit by using a clamping circuit for clamping the image output signal of the photodiode of the second photoelectric conversion circuit.

3. A method according to claim 2; further comprising the steps of providing a plurality of image sensor IC blocks, each comprising plural ones of the photoelectric conversion circuits; and keeping a chip selection switch of a respective image sensor IC block ON during a time interval when signals are being output from all photoelectric conversion circuits of the image sensor IC block.

4. A method according to claim 3; further comprising the step of providing each image sensor IC block with a clamping circuit connected to another terminal of the chip selection switch.

* * * * *